United States Patent [19]

Seimiya et al.

[11] 4,280,989

[45] Jul. 28, 1981

[54] METHOD OF PREPARING SILICON NITRIDE

[75] Inventors: Motoo Seimiya, Yokosuka; Katsutoshi Nishida, Yokohama, both of Japan

[73] Assignee: Tokyo Shibaura Denki Kabushiki Kaisha, Kawasaki, Japan

[21] Appl. No.: 158,875

[22] Filed: Jun. 12, 1980

[30] Foreign Application Priority Data

Nov. 14, 1979 [JP] Japan .................................. 54/146497

[51] Int. Cl.$^3$ ............................................. C01B 21/06
[52] U.S. Cl. ................................................... 423/344
[58] Field of Search ................................ 423/344, 406

[56] References Cited

U.S. PATENT DOCUMENTS

| 4,117,095 | 9/1978 | Komeya et al. | 423/344 |
| 4,122,152 | 10/1978 | Mori et al. | 423/344 |

FOREIGN PATENT DOCUMENTS 1121293 7/1968 United Kingdom ..................... 423/344

OTHER PUBLICATIONS

Hoch et al. "Ceramic Bulletin" vol. 58, No. 2 (1979) pp. 187–190.

*Primary Examiner*—Jack Cooper
*Attorney, Agent, or Firm*—Oblon, Fisher, Spivak, McClelland & Maier

[57] ABSTRACT

A method of producing silicon nitride which comprises heating silica in a gas atmosphere comprising hydrocarbon gas, ammonia gas and hydrogen gas.

9 Claims, No Drawings

METHOD OF PREPARING SILICON NITRIDE

BACKGROUND OF THE INVENTION

1. Field of the Invention

The present invention relates to a method of preparing silicon nitride from silica.

2. Description of the Prior Art

Silicon nitride powder has been made by the following methods:
1. The reaction of nitrogen and silicon;
2. The vapor phase reaction of silicon tetrachloride or silane with ammonia; and
3. The nitridization of silica with carbon powder.

Each of these methods has deficiences. Method (1) requires silicon metal which is expensive and consequently, the silicon nitride produced is also expensive. Method (2) cannot be used for the mass production of inorganic refractory raw material, while Method (3) requires a long reaction time at elevated temperatures.

SUMMARY OF THE INVENTION

Accordingly, it is an object of the present invention to provide a low-cost method of preparing silicon nitride.

It is another object of the present invention to provide a method of mass producing silicon nitride.

Yet another object of the present invention is to provide a method of preparing silicon nitride in a short period of time.

These and other objects have now been attained in the present invention by heating silica in a gas atmosphere comprising hydrocarbon gas, ammonia gas and hydrogen gas.

DETAILED DESCRIPTION OF THE PREFERRED EMBODIMENTS

Silicon nitride is prepared by heating silica in a gas atmosphere comprising hydrocarbon gas, ammonia gas and hydrogen gas. The silica is reduced and nitrided by the gas atmosphere.

In order to minimize the reaction time, it is advantageous to use finely divided silica. The use of finely divided silica is not, however, critical if longer reaction times are acceptable. The use of finely divided silica increases the surface area in contact with the gas phase which reduces the reaction time. Preferably, the mean particle size of the silica is below 1 micron. More preferably, the mean particle size of the silica is below 0.1 micron. Most preferably, the mean particle size of the silica is between 0.001 and 0.05 microns. Commercial silica may be used, however, ammonia granulated silica is desirable because of the promotion of the reaction between the silica and the gas atmosphere. A small amount of silicon metal or silicon nitride may be used in admixture with silica.

The gas atmosphere must contain at least one component which is capable of reacting with silica to produce silicon carbide. Suitable for this purpose are hydrocarbons which are gaseous under the reaction conditions, especially the lower paraffinic hydrocarbons having from 1 to about 7 carbon atoms. Most desirably, the lower paraffinic hydrocarbons are methane, ethane, propane or mixtures thereof. The hydrocarbon gas reduces the silica to silicon carbide. The silicon carbide is nitrided by the ammonia. Ammonia dissociates at high temperatures and serves as a nitrogen source. Hydrogen gas prevents cracking of the hydrocarbon. Therefore, it is preferable to use a gas mixture comprising hydrocarbon, ammonia and hydrogen.

The ratio of hydrocarbon, ammonia and hydrogen in the gas affects the efficiency of the process for the production of silicon nitride. Preferably, the volume ratio of $NH_3/CH_4$ is between 0.1 and 50. More preferably, the ratio is between 1 and 10. The preferable volume ratio of $H_2/CH_4$ is between 1 and 100. More preferably, the ratio is between 5 and 50. When hydrocarbons other than methane are present, the hydrocarbon content should be converted into its methane equivalent based on carbon content.

The reaction temperature is typically from 1200° to 1600° C.; more preferable, 1350° to 1500° C. Where the reaction temperature is too low, the nitridization reaction will progress too slowly to be of practical value. Where the reaction temperature is too high, vaporization of silica will occur. Preferably, the reaction time is between 1 to 2 hours at 1600° C. and 4 to 10 hours at 1200° C. However, longer or shorter reaction times may be used.

Silicon nitride powder, obtained by the above reaction, may be heated in an oxidizing atmosphere, for instance air, to remove carbon adhered on the surface of the silicon nitride powder, the temperatures of from about 600° to 1000° C. are suitable.

Having generally described this invention, a further understanding can be obtained by reference to certain specific examples which are provided herein for purposes of illustration only and are not intended to be limiting unless otherwise specified.

EXAMPLES

The results of Examples 1-5 are tabulated in the table following Example 5.

EXAMPLE 1

1. Silica raw material; Aerosil OX-50 (manufactured by Degusa Company of Federal Republic of Germany, mean particle size of 0.04 micron and a surface area of 50 $m^2/g$).
2. Silica temperature; 1450° C.
3. Volume of silica charged; 6 g.
4. Boat volume to be filled with silica; 20 cc.
5. Boat material; carbon.
6. Gas atmosphere; $CH_4$, 15 l/hr; $NH_4$, 30 l/hr; and $H_2$, 600 l/hr.
7. Heating time; 3 hours.
8. Heating temperature; 1450° C.
9. Additional heating condition to remove adhered carbon; 800° C. for 2 hours in air.

EXAMPLE 2

1. Silica raw material; Vitasil #1500 (manufactured by Taki Chemical Company of Japan, mean particle size of 0.018 micron and a surface area of 180 to 230 $m^2/g$).
2. Gas atmosphere; $CH_4$, 30 l/hr; $NH_3$, 60 l/hr; and $H_2$, 600 l/hr.
3. Heating conditions; 1450° C. for 1.5 hours.
4. Other conditions identical to those of Example 1.

EXAMPLE 3

1. Silica raw material; Ammonia granulated silica-gel (surface area of 820 $m^2/g$).
2. Other conditions identical to those of Example 1.

EXAMPLE 4

1. Silica raw materail; Vitasil #1500 which is granulated in an ammonia solution.
2. Other conditions identical to those of Example 2.

EXAMPLE 5

1. Silica raw material; Vitasil #550 (manufactured by Taki Chemical Company of Japan, mean particle size of 0.025 micron and a surface area of 250 to 300 m²/g).
2. Other conditions identical to those of Example 2.

TABLE

| Example | Phases detected by X-ray diffraction analysis | | | | | Chemical analysis | |
|---|---|---|---|---|---|---|---|
| | $\alpha$-$Si_3N_4$ | $\beta$-$Si_3N_4$ | SiC | $Si_2ON_2$ | $SiO_2$ | O | C |
| 1 | 95 wt. % | 5 wt. % | ND* | ND | ND | 2.5 wt. % | 1.5 wt. % |
| 2 | 97 wt. % | 3 wt. % | ND | ND | Tr** | 3.6 wt. % | 1.2 wt. % |
| 3 | 93 wt. % | 5 wt. % | ND | ND | 2 wt. % | 4.6 wt. % | 0.5 wt. % |
| 4 | 95 wt. % | 5 wt. % | ND | ND | Tr | 3.9 wt. % | 1.0 wt. % |
| 5 | 97 wt. % | 3 wt. % | ND | ND | Tr | 3.5 wt. % | 1.1 wt. % |

*ND - not detectable
**Tr - trace

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A method of producing silicon nitride powder which comprises heating finely divided particulate silica to a temperature of 1200° C. to 1600° C. in a gas atmosphere comprising hydrocarbon gas, ammonia gas and hydrogen gas wherein the volume ratio of ammonia ($NH_3$)/hydrocarbon (methane equivalent) is between 0.1 and 50 and the volume ratio of hydrogen ($H_2$)/hydrocarbon (methane equivalent) is between 1 and 100.

2. The method of claim 1, wherein the silica is heated to a temperature of 1350° C. to 1500° C.

3. The method of claim 1, wherein said hydrocarbon gas is a lower paraffinic hydrocarbon.

4. The method of claim 1, wherein the volume ratio of ammonia ($NH_3$)/hydrocarbon (methane equivalent) is between 1 and 10.

5. The method of claim 1, or 4, wherein the volume ratio of hydrogen ($H_2$)/hydrocarbon (methane equivalent) is between 5 and 50.

6. The method of claim 1, wherein the mean particle size of said silica is below about 0.1 micron.

7. The method of claim 1, wherein the mean particle size of said silica is between 0.01 and 0.05 micron.

8. The method of claim 1, wherein the silicon nitride produced is $\alpha$-$Si_3N_4$.

9. The method of claim 1, wherein the silicon nitride powder produced is heated in an oxidizing atmosphere to remove carbon adhered to the surface of said silicon nitride powder.